United States Patent
Barlett et al.

(10) Patent No.: US 9,651,665 B2
(45) Date of Patent: May 16, 2017

(54) POSITIONING SYSTEMS

(75) Inventors: David Barlett, St. Ives (GB); Andy Thurman, Cambridge (GB)

(73) Assignee: u-blox AG, Thalwil (CH)

( * ) Notice: Subject to any disclaimer, the term of this patent is extended or adjusted under 35 U.S.C. 154(b) by 1002 days.

(21) Appl. No.: 13/825,501

(22) PCT Filed: Sep. 27, 2011

(86) PCT No.: PCT/GB2011/051827
§ 371 (c)(1),
(2), (4) Date: Apr. 22, 2013

(87) PCT Pub. No.: WO2012/042257
PCT Pub. Date: Apr. 5, 2012

(65) Prior Publication Data
US 2014/0145878 A1  May 29, 2014

(30) Foreign Application Priority Data

Sep. 28, 2010  (GB) .................................. 1016251.9

(51) Int. Cl.
*G01S 19/09* (2010.01)
*G01S 19/40* (2010.01)
*G01S 19/33* (2010.01)
*G01S 19/52* (2010.01)

(52) U.S. Cl.
CPC ............... *G01S 19/09* (2013.01); *G01S 19/40* (2013.01); *G01S 19/33* (2013.01); *G01S 19/52* (2013.01)

(58) Field of Classification Search
CPC .......... G01S 19/09; G01S 19/33; G01S 19/40; G01S 19/50
USPC ..................................................... 342/357.46
See application file for complete search history.

(56) References Cited

U.S. PATENT DOCUMENTS

| 5,914,685 A | 6/1999 | Kozlov et al. |
|---|---|---|
| 2001/0045905 A1 | 11/2001 | Syrjarinne et al. |
| 2008/0169979 A1* | 7/2008 | de Salas ................. G01S 19/03 342/357.4 |

OTHER PUBLICATIONS

International Search Report for corresponding PCT/GB2011/051827, completed Dec. 21, 2011 by Moreno J. Gonzalez of the EPO.
European Exam Report for Application No. 11773521.7, mailed Feb. 19, 2014, pp. 1-4.

* cited by examiner

*Primary Examiner* — Harry Liu

(57) ABSTRACT

A method is provided whereby a group of receivers local to one another make GNSS measurements of a number of satellites, from one or multiple different GNSS's, and by combining the measurements of the same satellites made by the different receivers it is possible given sufficient conditions to determine the positions of the receivers and the satellite errors such that the positions obtained are equivalent to those obtained from a traditional differential GNSS system, without the need for a static reference receiver at a known location.

22 Claims, 11 Drawing Sheets

POSITIONING SYSTEMS

RELATED APPLICATIONS

This application claims priority from PCT Patent Application Ser. No. PCT/GB2011/051827, filed 27 Sep. 2012, which claims priority from Patent Application Ser. No. GB1016251.9, filed 28 Sep. 2010, both of which are incorporated herein in their entirety.

FIELD OF THE INVENTION

This invention relates to technology and systems for determining the positions and/or velocities of groups of two or more devices which are in communication with one another.

BACKGROUND

Navigation systems using radio signals have been around for many years, and today the GPS system (Global Satellite Positioning) is arguably the best known, being the first satellite system to be available and widely used. Such satellite navigation systems are widely referred to within the general class of GNSS's (Global Satellite Navigation Systems) of which Glonass and Galileo are two further examples.

In addition to satellite navigation systems, there are a number of examples of radio location systems based on terrestrial radio signals. These include the E-OTD (Enhanced Observed Time Difference of Arrival) system used on GSM, UWB (Ultrawideband) systems, Wi-fi and ZigBee systems and many others within the general category of RFID (radio frequency identification), generally referred to as RTLS's (Real-Time Location Systems).

GNSS's provide global coverage for receivers that are able to receive the satellite signals (sufficient "visibility" of the sky) and inherent accuracies of about ten (10) metres. The basic accuracy of these systems is affected by three main classes of errors:
1. Satellite errors, including clock errors and imprecision in knowing the positions of the satellites when the navigation signals were transmitted;
2. Radio propagation errors in both ionosphere and troposphere; and
3. Receiver errors.

Many different techniques have been developed, and continue to be developed, in order to characterise and minimise the impact of these errors and thereby improve receiver performance in terms of accuracy, or alternatively better coverage into areas where the received signals are very weak and may otherwise be unusable.

One of the core methods used to improve performance is to make relative measurements and to use the principle of differential measurements. This approach is sometimes referred to as "double differencing". The concept is to place a first receiver at a known position; make measurements of the received signals; compute the satellite and radio link errors in these measurements and send the errors to a second receiver which can correct its own measurements using the correction terms and thereby achieve a position determination which suffers much less from satellite and radio link errors. Double differencing techniques like these are so effective that they can allow very precise measurements to be made using the signal carrier phase in addition to the basic code phase measurements.

U.S. Pat. No. 4,751,512 "Differential navigation system for remote mobile users" describes the process of differential positioning. The techniques are also widely described and used for GPS systems, such as in U.S. Pat. No. 5,148,179 "Differential position determination using satellites" and U.S. Pat. No. 5,442,363 "Kinematic global positioning system of an on-the-fly apparatus for centimeter-level positioning for static or moving applications". It has also been applied to particular GPS applications such as, for example, in U.S. Pat. No. 5,361,212 "Differential GPS landing assistance system", and U.S. Pat. No. 5,469,175 "System and method for measuring distance between two objects on a golf course".

Differential GPS systems are now widely deployed for commercial use sometimes using a locally installed reference receiver and sometimes using commercial or publicly broadcast differential correction data on services such as WAAS (Wide Area Augmentation System) and EGNOS (European Geostationary Navigation Overlay System).

Whereas all of the systems previously mentioned require the use of a reference receiver at a known location, other systems that do not have such a reference receiver are described for both one and two receiver configurations, as for example in U.S. Pat. No. 6,397,147 "Relative GPS positioning using a single GPS receiver with internally generated differential correction terms". This approach gives excellent relative accuracy, but both positions still have the same uncertainty as a standard GPS position fix.

Another popular way of improving the performance of GNSS's is to use different complementary technology, such as inertial navigation techniques or other radiolocation systems as an aid, particularly in areas with poor satellite signal coverage.

Assisted GPS is now widely used for commercial handheld mobile communications devices as a way of helping the GPS receiver to obtain a position fix under conditions where it would otherwise likely fail, or for helping it to acquire the satellite signals more quickly. Examples of these techniques are described in U.S. Pat. No. 7,295,156 "Cellphone GPS positioning system", U.S. Pat. No. 7,283,091 "Radio positioning system for providing position and time for assisting GPS signal acquisition in a mobile unit" and others.

Inertial systems, accelerometers and rate gyroscopes, are widely used to assist GPS. Initially such systems were only used in high performance military systems, but now low cost inertial systems are becoming common. Examples of such systems are described in U.S. Pat. No. 6,721,657 "Inertial GPS navigation system" and U.S. Pat. No. 5,657,025 "Integrated GPS/inertial navigation apparatus providing improved heading estimates".

There is, however, a continuing need for improved techniques.

SUMMARY

According to an aspect of the present invention there is therefore provided a method of locating positions of devices of a cluster of mobile devices, wherein a said device comprises a receiver to receive a location signal from a GNSS, wherein said location signal comprises timing data enabling a range to a satellite of said GNSS to be determined, and wherein a said device further comprises a transmitter to transmit said timing data to a remote receiver at a position processor, the method comprising: using a set of m said devices to determine timing data from a set of n satellites of said GNSS at each of said m devices to provide m·n measurements of said timing data; communicating said m·n measurements of said timing data to said position processor; using, at said position processor, said m·n measurements in combination with 3D positions for said n satellites at a time of each of said measurements to co-determine a corrected position in space for each of said m devices, a clock offset from a clock of said GNSS for each of said m devices, and a common space segment error for each of said n satellites, said common space segment error being a space segment error for a said satellite common to said m devices and including a satellite clock error for the satellite, and wherein a said corrected position in space comprises a said position in space corrected for said common space segment errors.

In embodiments of this approach a positional accuracy approaching or better than differential GPS can be achieved without the need for a fixed position point of reference to provide a space segment error. Instead in embodiments of the method none of the devices need have a known fixed position (although it will be appreciated that depending upon the application not all of the devices need be "mobile"). Depending upon the application, all of the devices (receivers) may be moving; in other applications some may be stationary and others moving. Broadly speaking, however, in embodiments the space segment error is a variable for the cluster of devices which is determined at the same time as the position of each device (and device clock offsets) by solving a set of simultaneous equations or minimizing a cost function. Thus in embodiments the space segment error is treated as a variable to be determined using data from the m·n measurements in much the same way that the device positions and clock offsets are determined. There is an assumption that the space segment error is common to the cluster of mobile devices, which depending upon the tolerable error puts a upper limit on the size of the cluster, albeit this is large, for example 10-100 kilometres. Similarly, because the approach is effectively solving a set of simultaneous equations (although preferably these are over-determined by making more measurements than a minimum necessary for the application in order to better constrain errors) there is a lower limit on the cluster size desirable to avoid some of the equations becoming singular. This lower limit depends upon the number of measurements and the magnitude of the errors involved, but may be of order 10 times the position error of a device.

The skilled person will appreciate that the timing data is typically derived from locating a position in the GPS direct sequence spread spectrum signal (typically to better than 1 chip), and that this effectively provides a pseudo or apparent range to the satellite. As described in more detail later, errors result from timing errors in the system, although for processing these are conveniently expressed as distances (by multiplying by the speed of light). The position of the satellite is needed, at the point in time of the measurements, and conveniently this may be obtained from the GNSS location signal, being modulated onto this signal. However the skilled person will appreciate that this information may also be obtained from other sources and may, for example, be locally stored in the position processor. It will be appreciated that the position processor may be a separate element of the system or may be incorporated into one (or more) of the devices.

Depending upon the implementation of the method there can be different constraints on the number of devices and satellites. In one approach the minimum number of measurements is at least equal to four times the number of devices plus the number of satellites each device takes measurements from; in other approaches, for example those in which at least some of the devices incorporate their own relative positioning systems to measure directly the position or range of one device relative to another, fewer measurements may be employed.

In some preferred embodiments at least three of the devices each include a relative positioning system to enable determination of the relative positions and clock offsets of these devices with respect to one another. More particularly, these relative positions may be determined by knowing the three ranges linking these devices. Many different types of relative position (range) determining system can be used including, but not limited to: RF, in particular UWB, SWB (sparse wide band); optical, for example infrared; and potentially even acoustic. Knowing these relative positions, these can be employed in co-determining the positions, device clock offsets, and space segment error as described above, that is when solving the simultaneous equations (minimizing the cost function). In embodiments a common clock reference is established for the local cluster of at least three devices, but it is not essential to establish this explicitly. In more detail for, say, three devices there are three links and hence three ranges and three device times (but only two clock offsets since one is dependent on the other two), giving five unknowns for six measurements, three sets of range and time between each pair. With four devices there are six links; broadly speaking the number of measurements corresponds to the number of links in a cluster.

In one approach to using the relative positions in the co-determining of the device positions and common space segment error, the at least three devices including a relative positioning system are used to define a plane (the relative positions of these devices define the plane) and then the variables in the co-determining are the 3D position (location) of (an origin of) the plane and the 3D orientation (roll, pitch and yaw) of the plane, and a time offset of a reference clock for the sub-cluster of at least three devices. Preferably the position of the plane is defined in the same (cartesian) co-ordinates used in the co-determining of the space segment error, preferably an ECEF co-ordinate frame. In an alternative approach the relative ranges and relative time differences between the devices (ie a range and a time difference measurement for each link/pair of devices) is expressed in the cartesian co-ordinates used for the co-determining and the co-determining described above is performed to determine the common space segment error without the intermediate step of defining a plane. With this approach the relative range/time measurements may be weighted, that is a weight may be applied to the combination of parameters (cartesian co-ordinates) in which the range or time is expressed, for example to reflect the accuracy or signal-to-noise ratio of a range/time measurement.

For further details of determining relative positions from range/time information reference may be made to our earlier filed patent application GB0913367.9, hereby incorporated by reference in its entirety.

Embodiments of the approach described above are particularly advantageous in providing accurate position measurements, especially for a cluster of devices in which some are able to see few or no GNSS satellites. It is difficult to derive a simple inequality defining the required number of measurements, but it appears possible to determine the common space segment error with three devices in which one can see four satellites and the other two three satellites if the range/time approach described above (without use of an intermediate plane) is employed; if the ranges and times are mapped to a plane then it appears preferable to have at least two of the devices able to see four satellites (the other seeing only three). It will be appreciated that it is preferable to over-constrain the solution with more measurements than the minimum, for reduced noise/increased accuracy.

In embodiments of the above described method the satellites may comprise satellites of two or more GNSS systems, in which case the co-determining further comprises determining a time offset between the different GNSS constellations (still presuming a common space segment error).

The skilled person will appreciate that a doppler measurement of the location signal can provide a range velocity (along a line between the measuring device and the satellite). In some embodiments of the approach this can be used to provide an additional device position constraint, in particular where sets of measurements are obtained at different times. In embodiments, therefore, one or more of these range velocities may be employed in the above described co-determining procedure to constrain one or more of the corrected positions of the devices, for increased accuracy.

In a related aspect the invention provides a system for locating positions of devices of a cluster of mobile devices, wherein a said device comprises a receiver to receive a location signal from a GNSS, wherein said location signal comprises timing data enabling a range to a satellite of said GNSS to be determined, and wherein a said device further comprises a transmitter to transmit said timing data to a remote receiver at a position processor, the system comprising: means for using a set of m said devices to determine timing data from a set of n satellites of said GNSS at each of said m devices to provide m·n measurements of said timing data; means for communicating said m·n measurements of said timing data to said position processor; and means for using, at said position processor, said m·n measurements in combination with 3D positions for said n satellites at a time of each of said measurements to co-determine a corrected position in space for each of said m devices, a clock offset from a clock of said GNSS for each of said m devices, and a common space segment error for each of said n satellites, said common space segment error being a space segment error for a said satellite common to said m devices and including a satellite clock error for the satellite, and wherein a said corrected position in space comprises a said position in space corrected for said common space segment errors.

Any convenient communications link may be employed for communication between the devices of the measurement (timing) data for example including, but not limited to, Zigbee (trade mark) ultra wide band (UWB), sparse wide band (SWB), communications in the ISM (industrial scientific and medical) band, and so forth.

In a related aspect the invention provides a position processor for locating positions of devices of a cluster of mobile devices, wherein a said device comprises a receiver to receive a location signal from a GNSS, wherein said location signal comprises timing data enabling a range to a satellite of said GNSS to be determined, and wherein a said device further comprises a transmitter to transmit said timing data to a remote receiver at said position processor, the position processor comprising: an input to receive measurement data comprising timing data measurements from a set of m said devices for each of a set of n satellites of said GNSS; a computation engine configured to use said m·n measurements in combination with 3D positions for said n satellites at a time of each of said measurements to co-determine a corrected position in space for each of said m devices, a clock offset from a clock of said GNSS for each of said m devices, and a common space segment error for each of said n satellites, said common space segment error being a space segment error for a said satellite common to said m devices and including a satellite clock error for the satellite, and wherein a said corrected position in space comprises a said position in space corrected for said common space segment errors.

In some preferred embodiments the computation engine is configured to use relative range and timing data of three or more of the devices in combination with the GNSS measurements in either a local or earth centred co-ordinate frame in the set of simultaneous range equations which the computation engine solves to determine a device location. As previously mentioned this can be particularly advantageous when, for example, not all devices in a cluster can see a useful number of satellites.

The invention further provides a carrier carrying processor control code to implement a method/computation engine as described above. This code may comprise software and/or hardware definition code—for example in embodiments it is convenient to implement some of the lower level functions in silicon and some of the higher level of functions on a DSP. Thus the carrier may be, for example, a disk, CD-or DVD-ROM, or programmed memory such as read-only memory (Firmware). The code (and/or data) may comprise source, object or executable code in a conventional programming language (interpreted or compiled) such as C, or assembly code, for example for general purpose computer system or a digital signal processor (DSP), or the code may comprise code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

In a related aspect the invention provides a method of determining one or both of location positions and velocities of devices of a cluster of p mobile devices, wherein a set of m devices of said cluster of p mobile devices each comprise a receiver to receive a location signal from a GNSS and a transmitter to transmit said timing data to a remote receiver at a position processor, and wherein m≤p, the method comprising: using said set of m said devices to determine code phase data and timing data from n common satellites of said GNSS at each of said m devices to provide m·n measurements of code phase and timing data; communicating said m·n measurements of said code phase data and said timing data to said position processor; using, at said position processor, said m·n measurements of said code phase data and said timing data in combination with 3D positions for said n satellites at a time of each of said measurements to determine a pseudo-range of each of said m devices from each of said n common satellites, a clock offset from a clock of said GNSS for each of said m devices, a range velocity for each of said m devices, and a common space segment error for each of said n satellites, said pseudo-range being an estimated range of one of said n common satellites at one of said m devices, said estimated range comprising a real range portion and a common space segment error, said range velocity being the velocity along a line from a said device to a said satellite common to said m devices, said common space segment error being a space segment error for a said satellite common to said m devices and including a satellite clock error for the satellite; using said pseudo-range, said range velocity, said clock offset and said common space segment error in combination with 3D positions for said n satellites to co-determine one or both of a corrected position in space and a velocity for each of said m devices.

As previously described, depending upon the implementation of the method there can be different constraints on the number of devices and satellites. In one approach the minimum number of measurements is at least equal to four times the number of devices plus the number of satellites each device takes measurements from; in other approaches, for example those in which at least some of the devices incorporate their own relative positioning systems to measure directly the position or range of one device relative to another, fewer measurements may be employed.

In some preferred embodiments, at least one of said set of m devices of said cluster of p mobile devices and at least three devices of said cluster of p mobile devices include a relative positioning system to enable determination of relative positions of said devices with reference to one another. A common clock reference may also be established between the devices. The relative positions of the at least three devices of the cluster of p devices may be established, and the relative positions of the at least three devices may be used in combination with the pseudo-range, the range velocity, the clock offset and the common space segment error to determine a corrected position in space for each of the at least three devices.

In accordance with a first embodiment five (5) or more receivers operating in a collaborative manner make measurements of five (5) or more common GNSS satellites receivable by each; the measurements comprising code phase and time plus optionally carrier phase and Doppler; the measurements being used to construct pseudorange, range velocity and receiver time offset parameters; these measurements being passed to a position computation device, that may be separate from the receivers or part of one or more of them, that is able to compute the positions (X, Y, Z) and time offsets of all of the receivers, and the errors contributed by the satellite and radio segments of the GNSS.

In a variant three (3) or more receivers operating in a collaborative manner make measurements of six (6) or more common GNSS satellites receivable by each of them, and in a manner described for the first embodiment above compute the positions (X, Y, Z) and time of all the receivers and the errors contributed by the satellite and radio segments of the GNSS.

In a second variant two (2) or more receivers operating in a collaborative manner make measurements of eight (8) or more common GNSS satellites receivable by each of them, and in a manner described for the first embodiment above compute the positions (X, Y, Z) and time of all the receivers and the errors contributed by the satellite and radio segments of the GNSS.

In a third variant a number of receivers make measurements of GNSS satellite signals as described previously; this time receiving at least 9 (for 2 receivers), 7 (for 3 receivers), 6 (for 4 receivers) or 5 (for 6 receivers) common satellite measurements in which the satellites are from two or more different systems; the measurements are passed to a position computation device which may be co-located with one or more of the receivers or it may be separate, which is able to compute the positions (X, Y, Z) and the time offsets of the receivers with respect to each of the two or more satellite systems as well as the errors contributed by the satellite and radio segments.

In a second embodiment a fully interconnected cluster of receivers with known relative positions and time offsets based on a local cluster coordinate reference system, determined, for example, by using radiolocation or other techniques, make measurements of GNSS satellite signals; of which at least a common four (4) satellites are receivable by at least three (3) of the receivers in the cluster; which measure pseudo (apparent)-ranges based on chirp phase and/or carrier phase, Doppler and time; and using these measurements together with knowledge of the relative positions of the cluster of receivers a position computation device, which may be separate from the receivers or combined with one or more of them, computes the time offset, position and orientation of the cluster within the reference coordinate frame of the GNSS as well as the satellite and radio propagation segment errors for each satellite, and thus (high precision) position and time information for every device in the cluster without the need for a fixed GNSS reference receiver.

DETAILED DESCRIPTION

Figure 1:
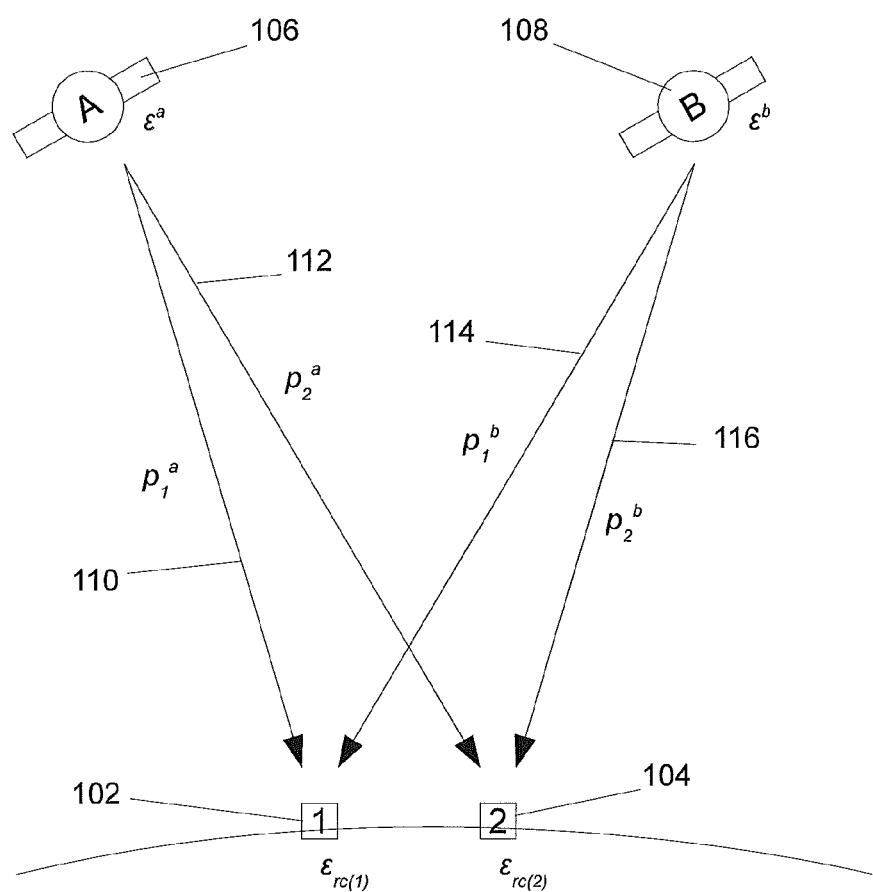
FIG. 1 shows the signals and signal paths for two receivers near to one another receiving signals transmitted by two satellites.

The system described herein uses measurements from two or more GNSS receivers, which may be combined with measurements from other assistive technologies such as radiolocation systems in order to achieve positioning precision equivalent to that obtained using differential GPS systems, without the need for a fixed reference receiver at a known location, and without the need for correction data supplied by public SBAS (Satellite Based Augmentation Service) services such as EGNOS, WAAS, GAGAN, MSAS or others.

In order to work unaided the system needs to meet certain sufficiency criteria defining the number of receivers used and the number of satellites in common between the receivers, and this allows it to resolve and minimise errors in the satellite and radio path segments of the GNSS.

This system has significant advantages in applications using two or more GNSS receiver devices operating in a cooperative or collaborative manner within the application, to which it provides both accurate relative positions (and velocities) as well as accurate absolute positions within the GNSS reference coordinate system.

The system may be further enhanced by using radiolocation and other techniques within the wireless network used to connect the devices to one another. These networks provide data communications capability, but may also allow accurate relative position information to be derived as range and range velocity measurements. Technologies capable of doing this include UWB (Ultrawideband), SWB (Sparse Wideband), ZigBee, Wi-Fi, infrared, optical, acoustic, and others. Having direct range measurements for linked devices allows the GNSS positioning equations to be constrained, and this can allow the positions of devices in poor satellite signal areas to obtain improved position fixes when fewer satellites are receivable. This approach can lead to significant benefits when operation across indoor-outdoor zones is required, with some receivers in good satellite signal areas, and others in areas of poor coverage.

Thus we describe a method whereby a group of receivers local to one another make GNSS measurements of a number of satellites, from one or multiple different GNSS's, and by combining the measurements of the same satellites made by the different receivers it is possible given sufficient conditions to determine the positions of the receivers and the satellite errors such that the positions obtained are equivalent to those obtained from a traditional differential GNSS system, without the need for a static reference receiver at a known location.

When the group of receivers is also able to make independent measurements of the ranges interconnecting them, typically using a different range measuring technique, these range measurements are used together with the GNSS measurements in order to determine accurate device positions—equivalent to differential GNSS without the need for a fixed reference receiver—whilst reducing the number of satellites that each receiver needs to "see".

This technique therefore allows a group of mobile receivers to be able to determine their positions at differential GNSS accuracies, without the need for a reference receiver and or correction service such as those offered by public SBAS systems. The group of devices operating in this cooperative manner can furthermore make the correction data available to other devices which are also able to operate at differential accuracies.

Basic GNSS Pseudo-Range Measurement

With reference to FIG. 1 a receiver (102, 104) that receives and measures signals transmitted by one or more GNSS satellites (106, 108) produces a pseudo-range measurement for each satellite (110, 112, 114, 116). Each pseudo-range measurement is an estimate of the range of the receiver from the satellite and can be described as a sum of the real range plus measurement errors. Measurement errors fall into several different classes, and a detailed discussion of them is available in many published sources in the literature; for example: "Understanding GPS: Principles and Applications, Second Edition", Elliott Kaplan and Christopher Hegarty.

For receivers located in the same general area (defined as tens to hundreds of kilometres depending on the performance required) the signals from any one satellite follow a substantially similar path to the different receivers, for example 110 & 112, and 114 & 116, and therefore we can approximate the pseudo-range equation as follows:

$$p_i^s = \rho_i^s + \epsilon_{rc(i)} + \epsilon^{sc(s)} + \epsilon^{orbit(i,s)} + \epsilon^{atmos(i,s)} + v_i^s$$

where:
- $p_i^s$ is the pseudo-range measurement of satellite s made by the $i^{th}$ receiver;
- $\rho_i^s$ is the real range between satellite s and receiver i;
- $\epsilon_{rc(i)}$ is the receiver clock error for receiver i;
- $\epsilon^{sc(s)}$ is the satellite clock error for satellite s;
- $\epsilon^{orbit(i,s)}$ is the orbital error for satellite s projected onto the range vector to receiver i;
- $\epsilon^{atmos(i,s)}$ is the radio path error between satellite s and receiver i;
- $v_i^s$ represents other errors in the measurement of satellite s by the $i^{th}$ receiver.

The errors are in metres (timex speed of light). In this notation, subscripts generally reference the ground and superscripts, space.

For receivers that are located within the same general area, the signal paths from a satellite to the different receivers are very similar given the height and distance of the satellites. Therefore these error signals are closely correlated and it is a reasonable step to lump them together as a single error term for the satellite in question. This, therefore, simplifies the generic range equation as follows:

$$p_i^s = \rho_i^s + \epsilon_{rc(i)} + \epsilon^s + v_i^s \quad (1)$$

which leaves us with:
- an unknown range term $\rho_i^s$;
- an unknown receiver clock error $\epsilon_{rc(i)}$;
- an unknown error representing the satellite and space segment errors associated with a particular satellite $\epsilon^s$;
- the uncharacterised error term $v_i^s$.

Given that the receiver position is defined in three dimensions there are a total of five (5) unknowns associated with this measurement plus the uncharacterised error term which we either treat as zero for a direct solution to the equations, or we seek to minimise it when using a numerical minimisation approach to solving the equation set. The way to deal with this residual error term is well known to those skilled in the art.

Using Multiple Measurements to Solve for the Receiver Position

The equation (1) above has shown that for a single receiver measurement of a single satellite there are five (unknown) variables, ignoring the uncharacterised error term.

If a second receiver in the vicinity of the first receiver makes a measurement of the same satellite at the same time—or more precisely the same signal that was transmitted by the satellite—a second equation containing five (5) unknowns arises. However, due to the receivers being in the same vicinity the space segment error $\epsilon^s$ is similar to that for the first receiver, and can be treated as being the same. This results in four (4) more unknowns, being the position and clock offsets of the second receiver.

If on the other hand the first receiver measures the signal from a second satellite, its position and clock offset remain the same, but one additional unknown, being the space segment error associated with the second satellite, is added.

Extending the measurements to m receivers each of which measures the signals from the same n satellites, yields a set of equations with:
- m·n measurements
- n satellite unknowns
- 4·m receiver unknowns which leads to a solvable set of simultaneous equations (1) provided that the following inequality holds true:

$$4 \cdot m + n \leq m \cdot n \quad (2)$$

In the event that equation (2) is equal, the uncharacterised error is set equal to zero and the set of equations can be solved by direct substitution. In the event that the right hand side of the equation is greater than the left the uncharacterised errors are lumped together and the least squares error sum is minimised using a numerical minimisation technique, such as that after BFGS (Broyden-Fletcher-Goldfarb-Shanno) or others. Those skilled in the art will be familiar with such methods, practical implementations of which can be found in published literature such as "Numerical Recipes in C++, The Art of Scientific Computing", William Press, Saul Teukolsky, William Vetterling and Brian Flannery.

System for Solving the Receiver Positions

Figure 2:
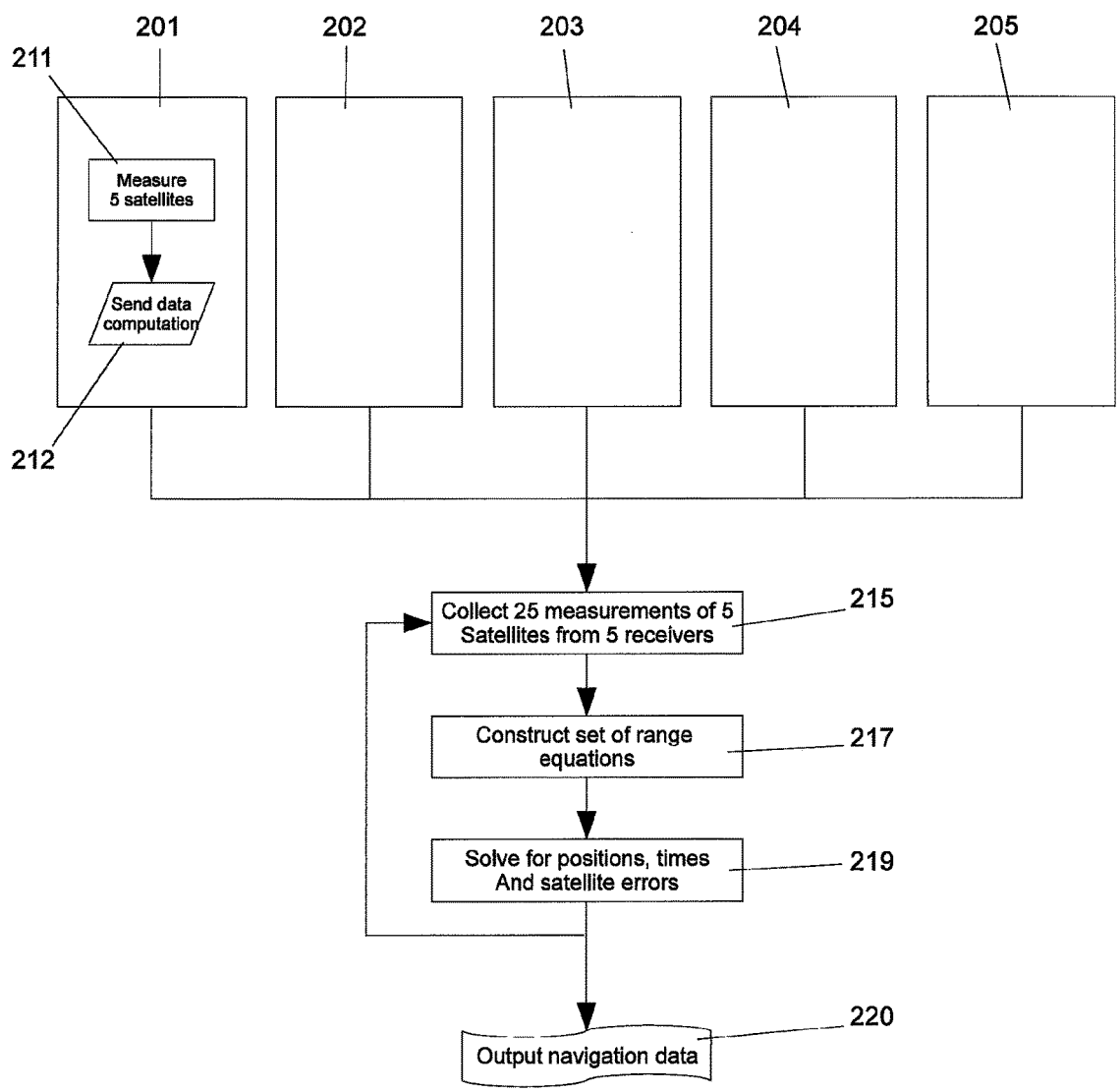
FIG. 2 is a block diagram of the basic system in which five receivers each receive signals from 5 satellites and pass them to a computational device which computes the positions, times and satellite errors.

In a first embodiment, illustrated in FIG. 2, of the system five (5) receivers (201, 202, 203, 204, 205) each measure the signals from five (5) satellites (211). From equation (2) we see that there are 25 measurements (215) and 25 unknowns which leads to a solvable system of simultaneous equations.

Each receiver measures the signals it receives from the five (5) satellites (211) and sends these (212) to a position computation device. The position computation device may be separate from the receivers or it may be co-located with one or more of the receivers, or it could be distributed amongst the receivers, each one carrying out a part of the computation. There may be multiple computation devices each one computing its own solution to the equation set. In all of these cases it is considered to be a separate logical entity.

The position computation device arranges the measurements into a set of simultaneous equations (217) using a mathematical construction along the following lines:

$$F = \sum_{i,s}^{m,n} [p_i^s - \rho_i^s - \varepsilon_{rc(i)} - \varepsilon^s]^2 \quad (3)$$

in which the receiver and satellite positions are expressed in Cartesian coordinates using a suitable ECEF (earth centred earth fixed) coordinate reference frame for the GNSS (i runs from 1 to m; s runs from 1 to n). The task of solving the equations is thus one of minimising the error squared, the value of F, which is also sometimes referred to as the function cost (219).

The results (220) of solving the equation set are the positions for each of the receivers, the clock offsets of the receivers and the space segment error term for each satellite:

$$\{X_i, Y_i, Z_i\}, i=1 \ldots m$$

$$\{\varepsilon_{rc(i)}\}, i=1 \ldots m$$

$$\{\varepsilon^s\}, s=1 \ldots n$$

where n is the number of satellites and m the number of receivers.

Since the space segment errors are one of the major error contributions in a GNSS, solving for them indirectly like this has the equivalent effect of measuring them directly using a fixed reference receiver at a known location, which is to yield positional accuracy as good as is achieved using conventional differential GNSS techniques.

Figure 11:
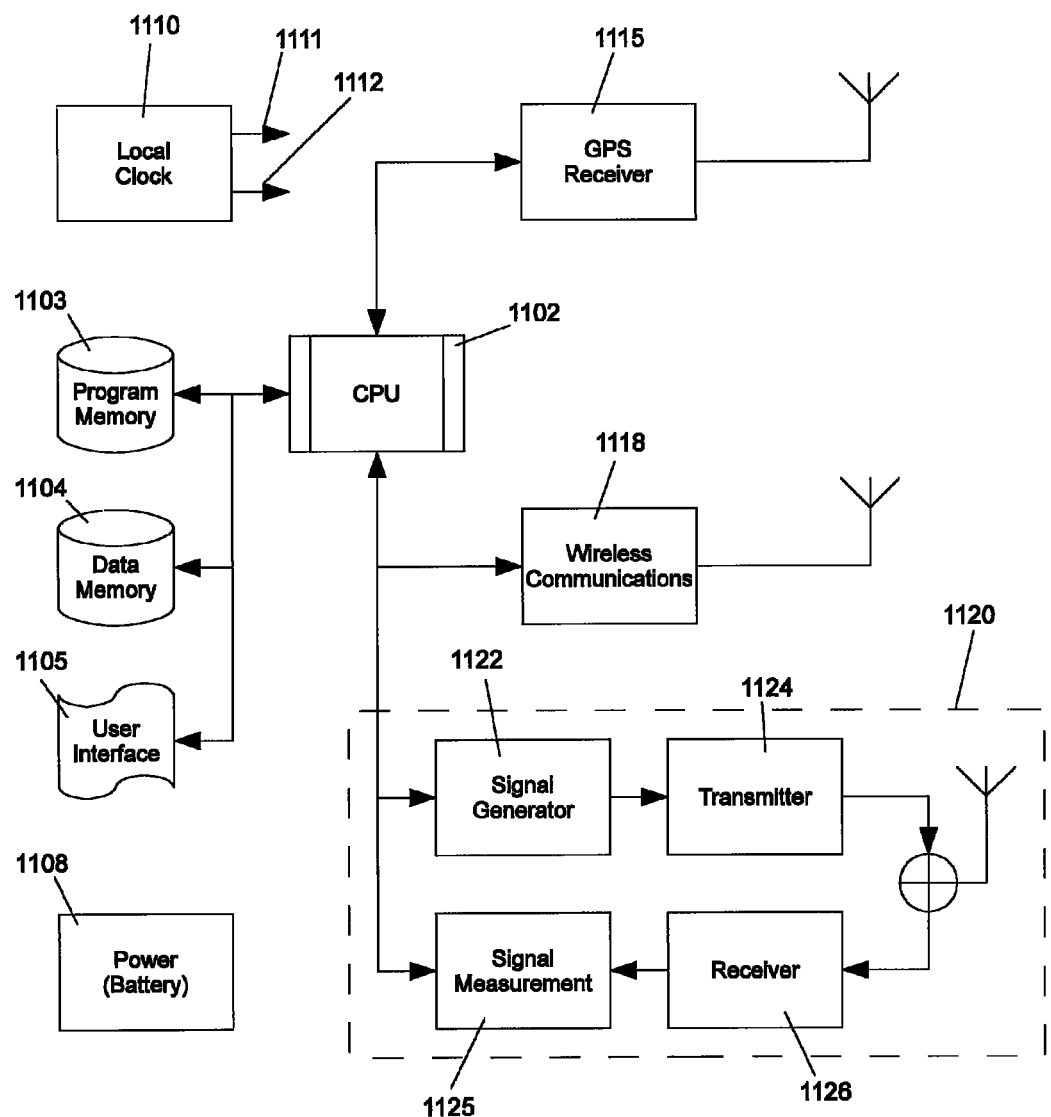
FIG. 11 is a block diagram showing a central processor connected to a GPS receiver and having a wireless communications interface for exchanging measurements with other devices and/or the position processor, and optionally a means for measuring range between it and neighbouring devices

FIG. 11 is a block diagram of a typical position computation device which is co-located with the GPS receiver (1115) and an optional radio range measuring sub-system (1120). A GPS receiver (1115) makes measurements of the satellite signals and passes the range and Doppler measurements to a central processing unit (1102). The CPU is connected to program memory (1103) in which processing instructions for the CPU are stored, Data Memory (1104) used for storage of working data and variables, and a User Interface (1105) which is used to present information to a user and receive commands from them.

The device includes a Wireless Communications subsystem (1118) which is used to send measurements and computation results to neighbouring devices, and to receive from neighbouring devices measurements that are used to carry out the position computation.

An optional radio range measuring sub-system (1120) comprising a signal generator (1122), transmitter (1124), receiver (1126) and signal measurement function (1125) may be used to make accurate measurements of the ranges, times and range velocities linking the device to its neighbours.

The device includes a power source such as a battery (1108), and it includes a Local Clock (1110) which provides common timing signals to the GPS and radio ranging sub-systems, thereby providing a single common time reference for measurements made by both.

The program code stored in the program memory (1103) defines the functions of the central processor (1102), directing it to carry out the data manipulation used to construct and solve the navigation equations as described above.

Corollaries and Alternative Configurations

Figure 4:
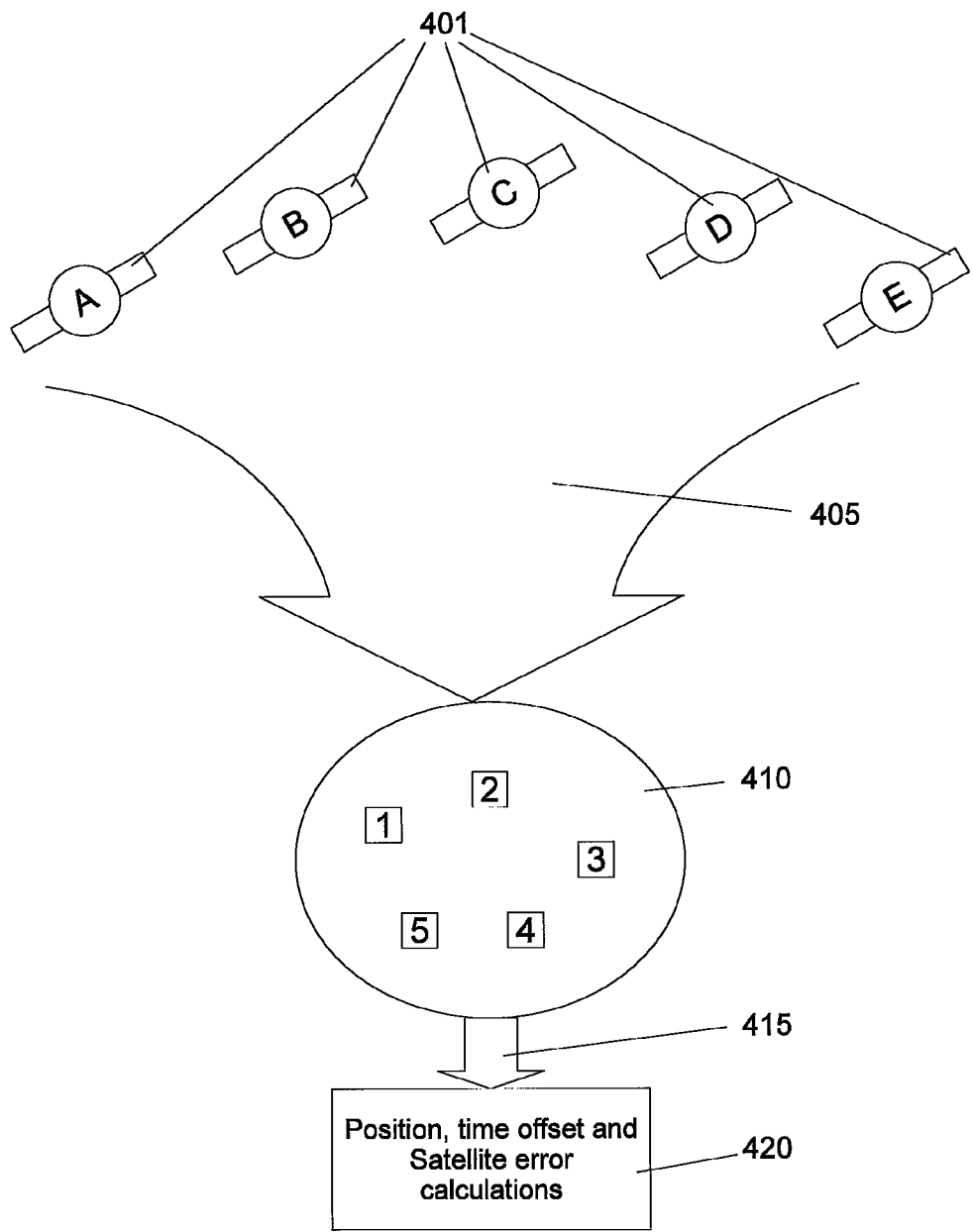
FIG. 4 is a system diagram showing the arrangement of five receivers each receiving signals from five satellites.

FIG. 4 illustrates as a system diagram five satellites (401) whose signals (405) are received and measured by five receivers (410). In the event that the receivers can measure the signals from more than the minimum required five (5) satellites, or if there are more than the required five (5) receivers, the additional measurement equations can be used within the equation set (3) which become increasingly more over-determined, the more measurements that are added. Whilst this may drive up the size of the minimisation problem, additional equations add robustness and error resilience which allow the minimiser to cope with unexpected errors, such as, for example, those caused by multipath. The ways of dealing with additional equations within the minimiser are well understood and those skilled in the art will appreciate that they generally provide benefits exceeding the computational cost at least until there are two or three times as many measurements as unknowns.

The space segment errors may be used by additional receivers not contributing to the above equation set as though they are conventional differential GNSS corrections. In this case the position processor sends the pseudo-range correction data to the additional receiver which applies them to its own measurements before computing its position to differential GNSS accuracy.

In the event that one or more of the receivers can measure additional signals from satellites not receivable by the other receivers the known accurate computed position can be used to directly estimate the space segment errors for the additional satellite using standard techniques applied within a conventional differential reference receiver.

An alternative arrangement uses three (3) receivers each measuring the signals from the same six (6) satellites. This results in a set of simultaneous equations having 18 measurements and 18 unknowns.

Yet another alternative arrangement uses two (2) receivers each measuring the signals from the same (8) satellites. This results in a set of simultaneous equations having 16 measurements and 16 unknowns.

Figure 3:
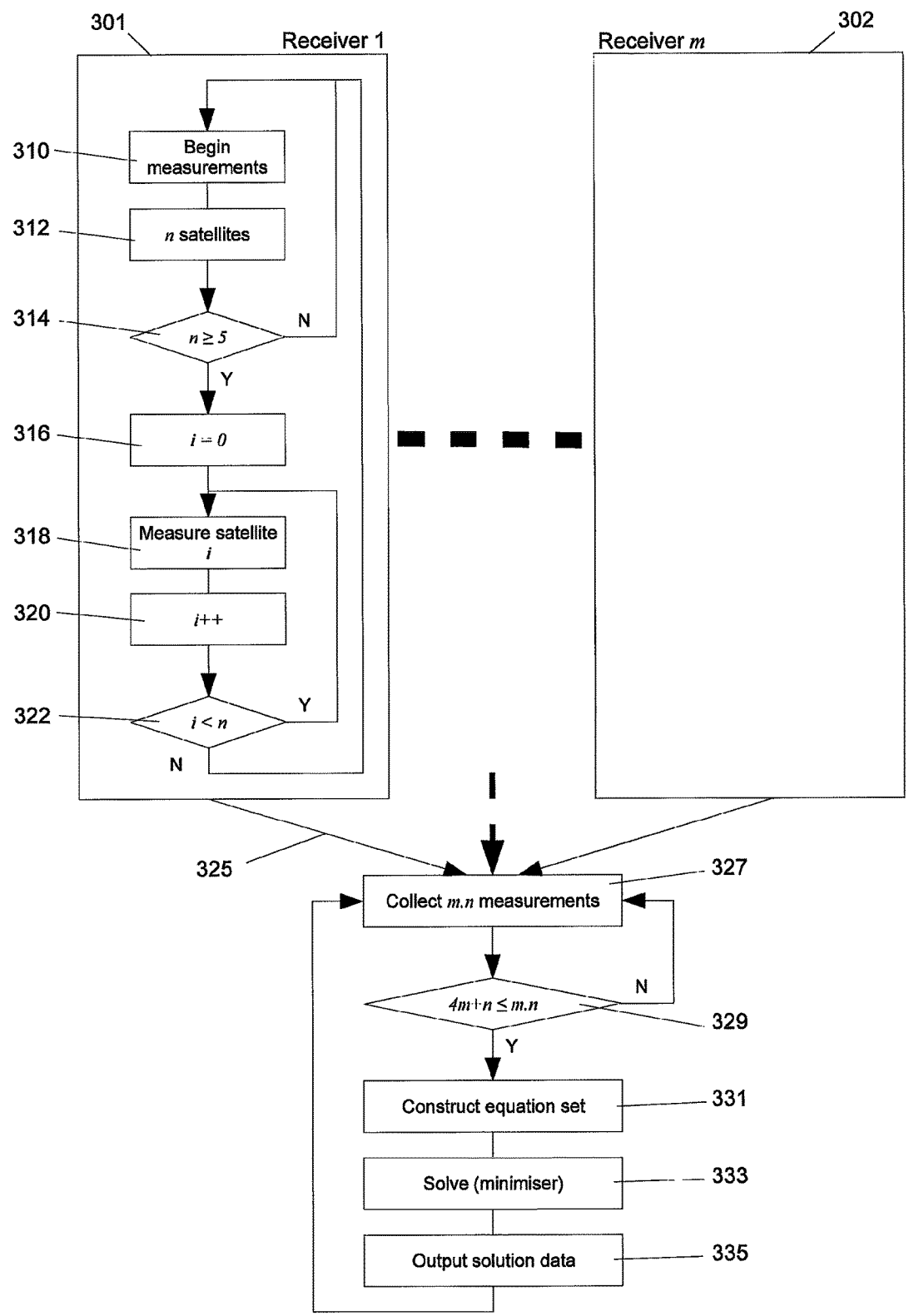
FIG. 3 is a block diagram of the generalised case in which 2 or more receivers receive signals from 5 or more satellites; pass the measurements to a computation device which computes the navigation results if the measurements meet the sufficiency requirements.

FIG. 3 shows a flow chart for the generalised solution. Two or more (m) receivers (301, 302) measure satellite signals (310). For each receiver, given visibility of n satellites (312), if n≥5 (314), the receiver measures the satellite signals (316, 318, 320, 322). This process may be carried out serially or in parallel. The receivers send their measurements to the computation device (325).

Given m receivers and n satellites the computation device therefore has m·n measurements (327). If the inequality 4m+n≤m·n is satisfied (329) the computation device is able to solve the navigation equations. It constructs the cost function using a set of equations based on the measurements (331), and then using a numerical minimisation technique solves (333) by minimising the cost function error. The resulting data (335) represents the navigation data: positions, times and satellite errors.

Since the system does not depend on a fixed receiver at a known location it may be appreciated that the receivers used in the computation may all be moving and can be part of a mobile group of receivers.

When the group of receivers comprises more than the minimum required, different selections of receivers receiving the required sets of common satellite signals may be used over time and it is not necessary to always use the same receivers as a reference set. Thus the choice of receivers to use can be managed dynamically based on their availability, quality of their signal reception and quality of the environment in which they are operating.

In the preferred embodiment it is assumed that the receivers include a communications link with the computation device which is able to receive the measurements made and to compute the resulting positions in real-time (with a small time lag to allow for communications latency and processing time). However, the receivers can also operate off-line, by storing their measurements in local memory for future off-line processing at a later time when the measurement logs have been retrieved.

Using Satellites from More than One GNSS

In the event that the receivers are able to receive and measure signals from more than one GNSS, such as for example from GPS, Glonass and Galileo, it is possible to compute the positions of the all devices to a high accuracy without the need for a reference receiver at a fixed known location. When multiple GNSS signals are used the measurement sufficiency conditions can be described as follows:

Given measurements made by m receivers each of which measures the signals from the same n satellites, from k different GNSS constellations, yields a set of equations with:
  m·n measurements
  n satellite unknowns
  k different GNSSs (unknowns, i.e. k−1 space segment time errors)
  4·m receiver unknowns
which leads to a solvable set of simultaneous equations (1) provided that the following inequality holds true:

$$4 \cdot m + n + (k-1) \leq m \cdot n \quad (4)$$

This leads to the generalised minimum measurement requirements of Table 1:

TABLE 1

| Number Receivers | 1 GNSS Sats Req | 2 GNSS Sats Req | 3 GNSS Sats Req |
|---|---|---|---|
| 2 | 8 | 9 | 10 |
| 3 | 6 |   | 7 |
| 4 |   |   | 6 |
| 5 | 5 |   |   |
| 6 |   | 5 |   |
| 7 |   |   | 5 |

Initially the requirement, for example, to receive at least 9 common GNSS satellites looks daunting; however, in this example, they are from two different GNSS satellite systems so it is sufficient to receive, for example, 5 GPS signals and 4 Glonass signals, or different combinations, which is, in fact, easier to satisfy than receiving 8 satellites from the same GNSS.

Empty cells in table 1 indicate that the minimum measurement requirements correspond to the cell above the empty cell, so for example, for 4 receivers and 1 GNSS satellite system 6 common GNSS satellites are required. Although the minimum measurement requirements are met with 3 receivers and 1 GNSS satellite system, the measurement by 4 receivers overdetermines the equation set. Similarly, 7 receivers and 2 different GNSS satellite systems requires 5 common GNSS satellites.

In the case of using multiple different GNSSs, there is an additional time offset that needs to be eliminated, being the time offset between the systems. This leads to a modified minimisation function for the computation device:

$$F = \sum_{i,s}^{m,n,k} [p_i^s - \rho_i^s - \varepsilon_{rc(i)} - \varepsilon^s - \varepsilon^{I-1}]^2 \quad (5)$$

in which the receiver and satellite positions are expressed in Cartesian coordinates using a suitable ECEF (earth centred earth fixed) coordinate reference frame for the GNSS (and $\epsilon^0$ for I=1 is assumed to be zero). The task of solving the equations is thus one of minimising the error squared, the value of F, which is also sometimes referred to as the function cost.

The results of solving the equation set are the positions ($X_i$, $Y_i$, $Z_i$ for each of the receivers, the clock offsets of the receivers, the space segment error term for each satellite and k−1 clock offset errors between GNSSs where k is the number of GNSSs used to make the measurements. Instead of computing the time offset between different GNSSs, this parameter could be obtained from a different source, such as a public service, assistance server, or other network facility. The information could be delivered over the wireless LAN, or as part of the correction data received from the GNSS. In this case the criteria for solving the equations using multiple GNSSs are identical to those proposed earlier for the single GNSS solution.

Second Embodiment-Assisted Configuration

Figure 5:
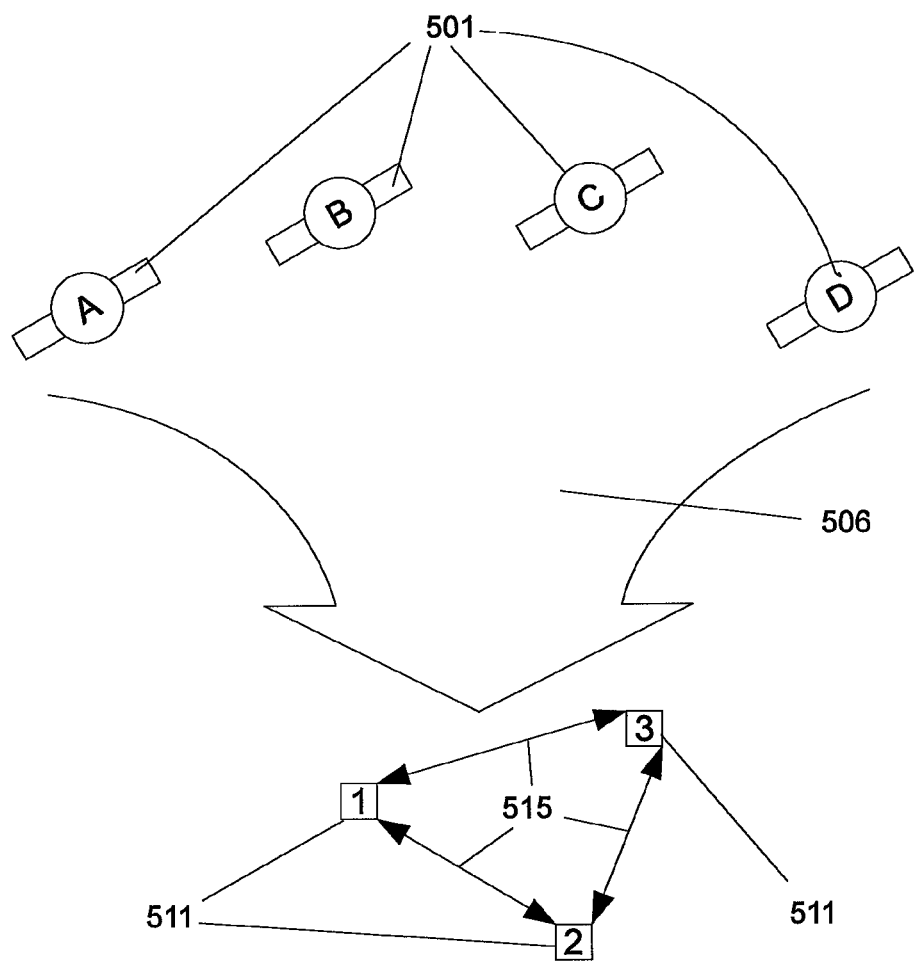
FIG. 5 is a system diagram showing the arrangement for three locally interconnected devices which receive signals from four satellites in order to compute positions, times and satellite errors.

With reference to the system diagram of FIG. 5, let there be three devices (511) which contain a GNSS receiver and another means to determine their relative positions (515). In this configuration the system is able to accurately determine the positions of all devices based on fewer GNSS (501)

measurements (506) than are required in the first embodiment. The following sections describe the different aspects of this system.

Determining the Relative Positions

Figure 6:
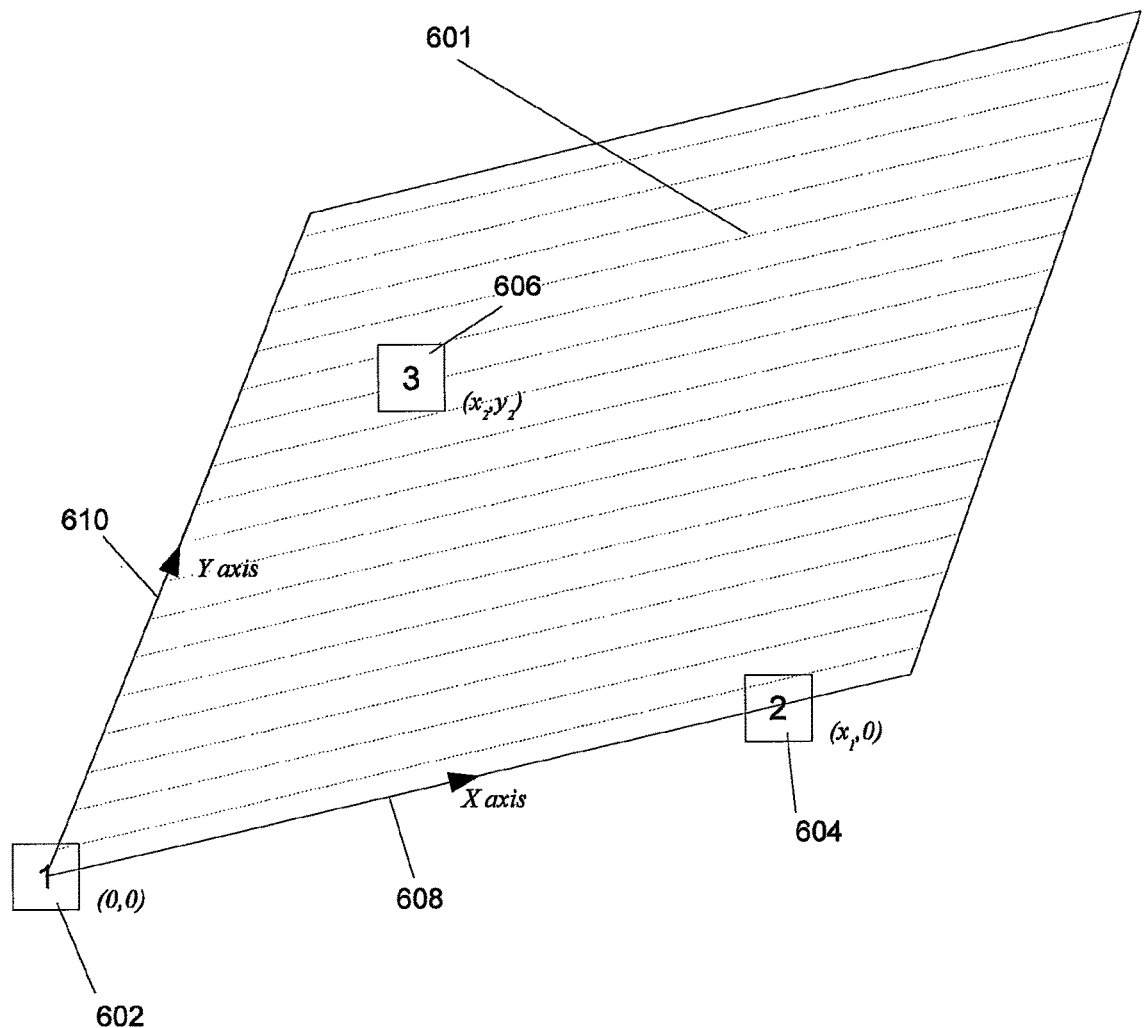
FIG. 6 illustrates how three devices are placed within a local coordinate system, such that they lie on a plane surface.

The means for determining the relative positions could be based on radio signals or other techniques such as acoustic or infrared. There are a number of methods for determining relative positions using radio signals; generally based on a range measurement of some kind. By knowing the three ranges linking the three devices (515) it is possible to determine their relative positions in a conventional Cartesian coordinate frame (608, 610). Usually in the absence of any reference frame the three devices are defined to lie on a plane (601) as illustrated in FIG. 6, with the first one (602) at the origin (x0=0, y0=0), the second (604) on one axis, for example (x1, y1=0) and the third (606) has non-zero values for both (x2, y2).

It is assumed that the method of determining the relative positions of the three devices is also able to determine their relative time synchronisation, and thereby reference all their local clocks to a common (single) time reference, which is typically chosen to be that of the first device.

Any known technique for determining the relative positions and times of the three devices may be used provided it is of sufficient accuracy to be used in the combined GNSS location solution that is described later. In general terms this means that the error should be better than, or at least comparable with, the GNSS error for the GNSS mode being used: non-differential, code-phase differential, carrier phase differential, RTK and the like. Our GB0913367.9 (incorporating by reference) describes an rf technique capable of better than 0.5 m; UWB can achieve better 10-30 cm; Zigbee™ can achieve 3-5 m, for example.

Location Problem for the Cluster of Devices

The three devices may be described as a cluster within which their relative positions on an arbitrary plane surface (701, 801) are known, and the time relationships between them are also known.

In order to locate the devices in a known reference coordinate frame, such as the ECEF (earth centred earth fixed) coordinate frame (704) typically used for GNSS, it is necessary to know the offset and orientation of the plane containing the cluster. This is determined unambiguously by six variables defining the six degrees of freedom of the plane:

X, Y, Z (position of the origin of the plane in ECEF coordinates) (702)

$\phi$, $\theta$, $\phi$(roll, pitch and yaw of the plane relative to ECEF) (804, 806, 808)

Figure 7:
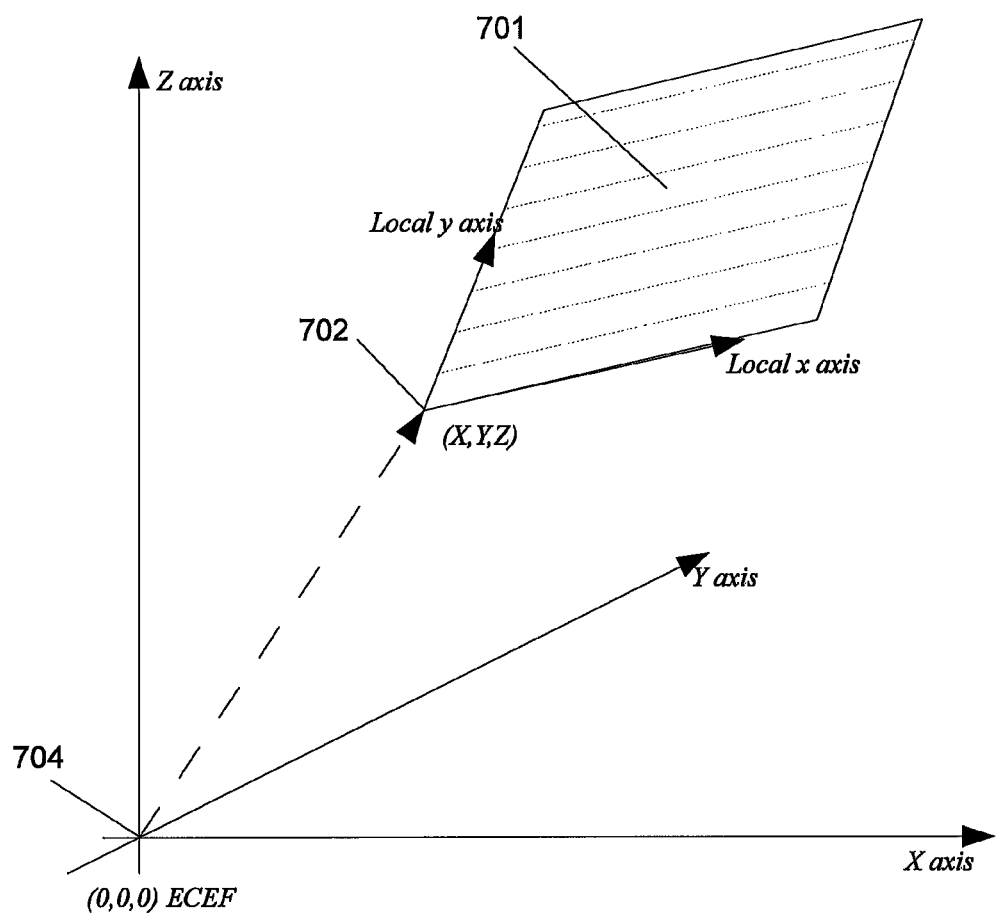
FIG. 7 illustrates how the local plane surface on which the three interconnected devices lie has an origin with offset in three dimensions with respect to an ECEF coordinate frame.
Figure 8:
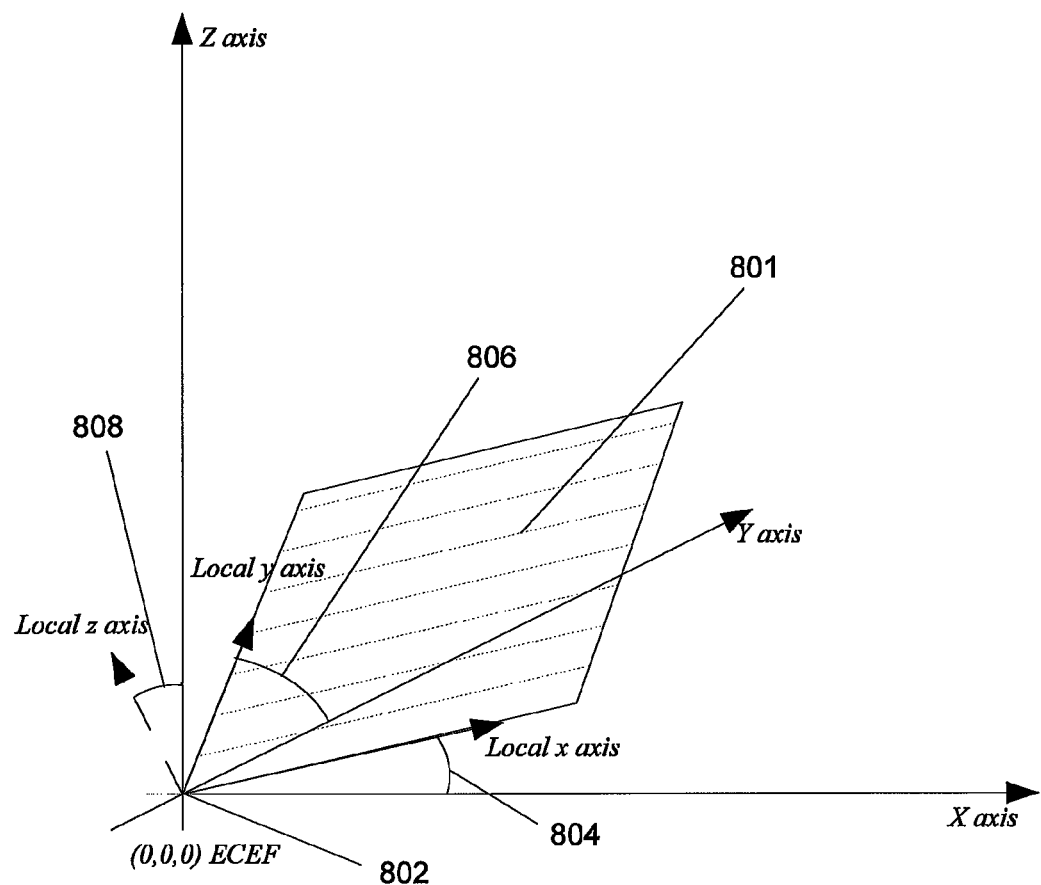
FIG. 8 illustrates how the local plane surface on which the three interconnected devices lie has a rotation described by three parameters: roll, pitch and yaw.

In order to locate this cluster using a GNSS it is necessary to solve for the above six positional unknowns and also the unknown time offset, T, of the cluster time from GNSS time. FIG. 7 illustrates how the local coordinate frame is offset from ECEF), and FIG. 8 illustrates how the local coordinate frame is rotated relative to ECEF.

However, the method described here is also able to eliminate the satellite and space segment errors from the solution. Once again using equation (1) as the basis for the pseudo-range equation set, this gives one additional unknown variable for each satellite signal that is used. This leads to the baseline scenario in which each of the three devices in the cluster receives and measures the signals from the same four (4) satellites. This yields 12 measurements which can be used to solve for the 11 unknowns describing the plane, time offset and satellite errors:

$\{X_0, Y_0, Z_0\}$, origin of local cluster
$\{\epsilon_o\}$, clock offset for local cluster reference
$\{e^s\}$, s=1 ... n, when n is the number of satellites, n=4
$\{\phi, \theta, \phi\}$, being the roll, pitch and yaw orientation of the local cluster which yields a location solution with an accuracy equivalent to differential GPS in which the satellite errors are removed based on error characterisation from a reference receiver, but without the need for such a reference receiver. In comparison to the system described in the first embodiment, accurate measurement of relative device positions leads to a problem that requires significantly fewer satellite measurements in order to solve. Two preferred ways for finding a full location solution will now be described.

First Methodology for Locating the Cluster

This first method for locating the Cluster is to use a direct loosely coupled three-step approach:

1. Use the local relative positioning system to determine the relative positions and time offsets of the devices in the cluster on a local coordinate frame (701);
2. Use the relative positions of the cluster devices to modify the pseudo-range equations for the satellite measurements, and thereby to solve for the position and orientation of the cluster plane and the cluster time offset (702, 804, 806, 808);
3. Rotate the local coordinate frame to be aligned with the GNSS coordinate system and add the two together to obtain the positions of the individual devices in GNSS coordinate space.

This approach has the advantage of being simple and direct, and it can be used in systems in which it is not possible or desirable to use method 2 (described below), or in which the devices are dependent on a "black-box" method for determining their relative positions.

The method used to perform step 2 above is now described in more detail.

From step 1 we have determined the positions of the three devices as follows within their local coordinate frame such that they lie on a 2D plane:

Device 0: $(x_0=0, y_0=0)$
Device 1: $(x_1, y_1=0)$
Device 2: $(x_2, y_2)$

We now define the cluster position as being (X, Y, Z) within the GNSS ECEF coordinate frame. Preferably, for convenience, this is also the position of Device 0. Keeping the origin coincident with the required (X, Y, Z) position makes the transformation easier because all that is needed is rotation of the local coordinates. For this we define three rotation matrices, one for each axis:

$$R_x = \begin{bmatrix} 1 & 0 & 0 \\ 0 & \cos(\theta) & -\sin(\theta) \\ 0 & \sin(\theta) & \cos(\theta) \end{bmatrix}$$

$$R_y = \begin{bmatrix} \cos(\varphi) & 0 & -\sin(\varphi) \\ 0 & 1 & 0 \\ \sin(\varphi) & 0 & \cos(\varphi) \end{bmatrix}$$

$$R_z = \begin{bmatrix} \cos(\psi) & -\sin(\psi) & 0 \\ \sin(\psi) & \cos(\psi) & 0 \\ 0 & 0 & 1 \end{bmatrix}$$

Using these we can rotate the position in the local coordinate frame to a position in the ECEF coordinate frame offset by (X, Y, Z) as follows:

$P_n = R_x R_y R_z p_n$ where $p_n$ is the position in the local coordinate frame and $P_n$ the coordinate offset from (X, Y, Z) in the GNSS ECEF coordinate frame.

The rotated transformed coordinates are substituted into the pseudo-range equations and thus all three points are represented in terms of (X, Y, Z) and (ø, θ, ϕ). It is now straight forward for someone skilled in the art to derive positions in ECEF for all the devices in the cluster.

Second Methodology for Locating the Cluster

Figure 9:
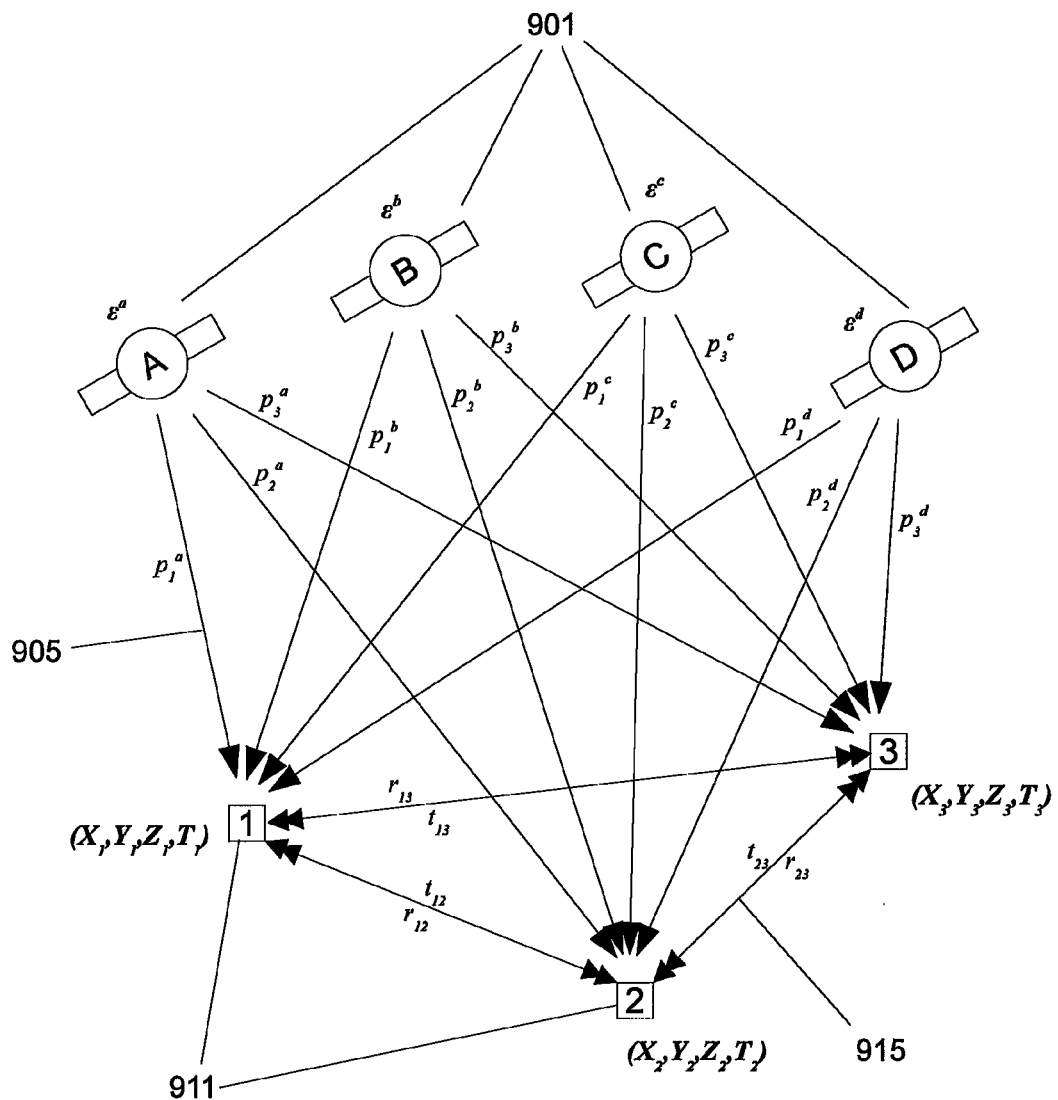
FIG. 9 shows a four satellite three receiver arrangement, identifying the signals that are measured and the parameters that are computed as a solution to the general navigation equations.

A second methodology is based on tightly coupling the cluster equations with the GNSS equations. FIG. 9 illustrates the measurements and parameters computed for the minimum arrangement of 3 device (911) and 4 satellites (901). This approach assumes that the minimisation function can make direct use of the raw relative position measurements, such as the device-to-device ranges and time offsets (915) before they are converted into relative positions in an arbitrary coordinate frame. The steps required are thus as follows:

1. Allow each of the devices (911) to have an unknown position in GNSS coordinate space, $(X_i, Y_i, Z_i, T_i)$;
2. Construct the ranging equations linking the devices in the cluster in terms of GNSS coordinate differences;
3. Construct the GNSS location equations for each device in the format of equation (1);
4. Construct a combined hybrid cost function using a set of equations that includes both cluster and GNSS ranging equations;
5. Solve the hybrid cost function directly to obtain $(X_i, Y_i, Z_i, T_i)$ and satellite errors $\epsilon^s$;

This approach requires that the two sets of measurements and ranging equations be combined at a fundamental level, and this may not always be possible.

One approach to combining the measurements is now described in more detail:

Each device makes measurements (905) of the four satellites in the GNSS and this results in four range equations of the form given in equation (1) for each device, being a total of 12 equations and 16 unknowns, when the satellite errors are included as unknowns which need to be solved for.

Each device also makes measurements of signals transmitted by its neighbours in the cluster (915). These measurements lead to range equations of the form:

$$r_{ij} = \sqrt{(X_j-X_i)^2+(Y_j-Y_i)^2+(Z_j-Z_i)^2}$$

and time offset equations of the form:

$$t_{ij} = T_j - T_i$$

where $r_{ij}$ and $t_{ij}$ are the measurements (915) that have been made locally between devices and they are expressed in terms of the same unknowns used within the GNSS measurements. These can be back-substituted into the range equation (s) above, optionally applying weights to the measurements (not to the free variables).

The different equations can now be combined into a system of equations having 16 unknowns and 18 measurements (for 3 devices each measuring 4 satellites and the ranges and time offsets of one another), which can be solved using a conventional minimisation technique in which a cost function is constructed and solved by numerical iteration using a technique such as that after BFGS (Broyden-Fletcher-Goldfarb-Shanno) or others. Those skilled in the art will be familiar with such methods, practical implementations of which can be found in published literature such as "Numerical Recipes in C++, The Art of Scientific Computing", William Press, Saul Teukolsky, William Vetterling and Brian Flannery.

Since the measurements being combined may be made in different ways and using different techniques it may necessary to combine the equations within the equation set for the cost function using appropriate weightings for the different equations, measurements and/or error terms. The way this is done is familiar to those skilled in the art.

Use of Doppler (Frequency Offset) Measurements

Since the measurements of the satellite signals may include frequency offsets and thus Dopplers and the local measurements between cluster devices may also include Dopplers, it is possible to construct equations representing range velocities. These may be combined in a similar way to that described above and it is also possible to use both range and range velocity equations within a single minimisation problem for a cluster of devices. This can lead to a more robust solution, apart from the obvious benefit of directly computing device speeds.

The satellite measurements, and possibly measurements of adjacent devices in the cluster, also contain measured frequency offsets of the signals at each receiver. Each frequency offset consists of the offset between the oscillators in the transmitter and receiver plus a Doppler factor caused by the radial velocity of the transmitter and the radial velocity of the receiver. These could be considered as a single relative radial velocity, which is useful for the relative cluster devices operating in their own local coordinate system, but for GNSS systems in which the velocities of the satellites are known in the ECEF coordinate system, it may be more useful to consider them separately.

Figure 10:
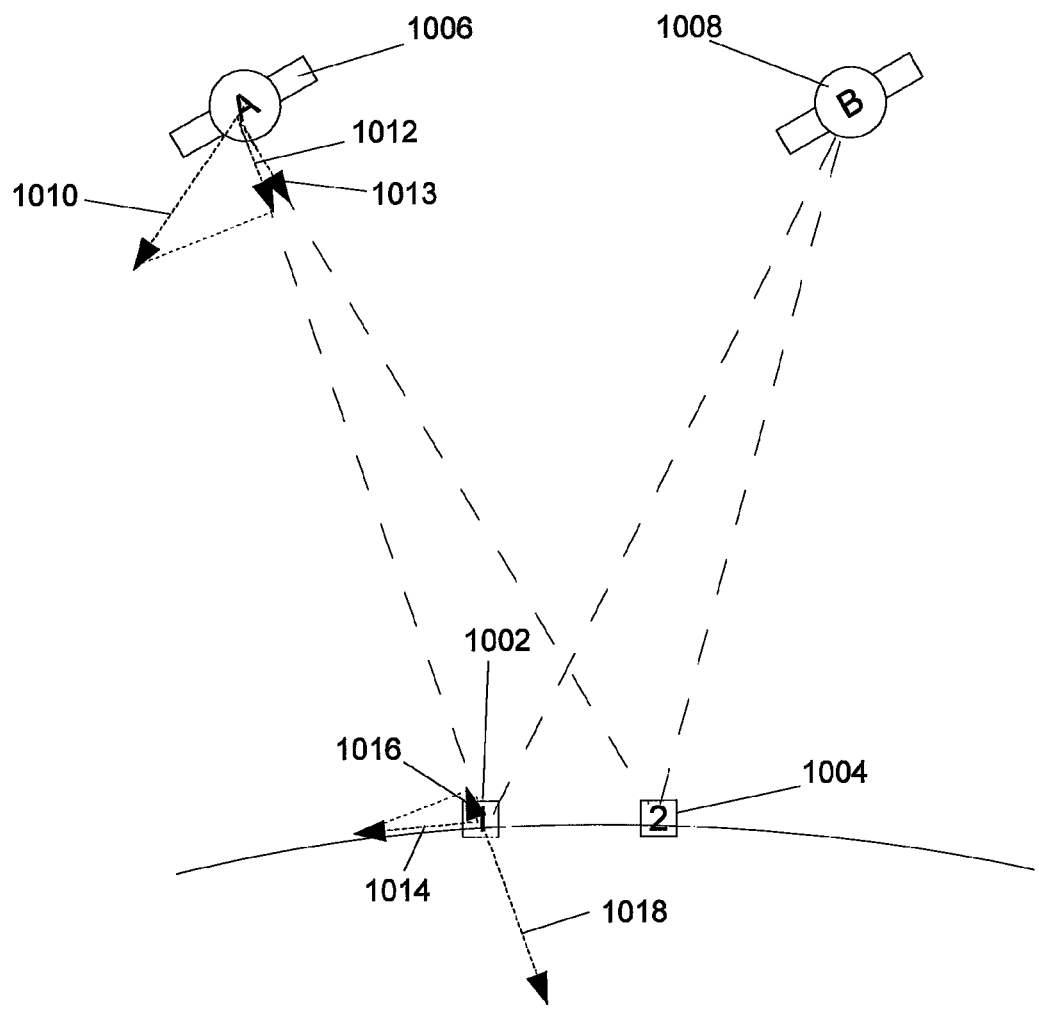
FIG. 10 illustrates how frequency offsets between satellite and receiver can be described as a sum of clock offsets, satellite Doppler and receiver Doppler, and represented as velocities.

FIG. 10 shows two satellites (1006, 1008) for which frequency offsets are being measured at two receivers (1002, 1004). The velocity of satellite 1006 introduces a Doppler frequency shift which is represented by the vector 1010 which subtends a radial velocity 1012 on the measurement at receiver 1002 and a radial velocity 1013 on the measurement at receiver 1004. Since the receivers are close to one another compared with the distance from the satellite, the radial velocity component for each receiver is substantially the same.

The receiver 1002 has a velocity 1014 which manifests as a further Doppler offset which can be subtended onto the measurement of satellite 1006 as the radial vector 1016. The clock offset between the receiver and satellite also manifests itself as a frequency error and this is represented by the radial vector 1018.

The frequency offset measured at the receiver comprises the sum of the actual clock frequency offset, the Doppler frequency caused by the satellite motion and the Doppler frequency caused by motion of the receiver. These can be summed and represented as a radial velocity.

If the position of the receiver is known, the equations can be used to solve for the receiver velocity, clock offset, and, in a similar way to that described for the positions, with sufficient receivers and satellites it is possible to solve for the satellite and space segment errors for each satellite used in the measurement set.

However, clock and frequency offsets have some additional useful characteristics that can be exploited:

Clocks can be relatively stable over long periods compared with the motion of the receiver and therefore the clock offset between satellites and receiver is generally stable and changes slowly compared with the changes introduced by motion (Dopplers);

Given known (estimated) device velocity it is possible to link successive position measurements over time, and thereby to use velocity and position calculations to solve for a motion trajectory.

Given that device velocities may be computed it is also possible to combine these with the measurement data in such a way that the measurements do not all have to be made at the same time. Therefore the system described is equally applicable to clusters of devices in which the satellite and relative device measurements are made at different times and not simultaneously as in embodiments described above. The ways in which measurements made at different times are known to those skilled in the art and are described in more detail, for example in our WO2008/084196 and GB0913367.9 filed 31 Jul. 2009, both incorporated by reference.

Patent application WO2008084196 provides details of a method of linking multiple phase and frequency offset measurements, at the same and different times, to construct a robust solution for the trajectory of a device. The same, and other techniques, can be used to link the range and Doppler measurements of both satellite location systems and relative range and range velocity measurements between adjacent devices.

Other Extensions and Alternatives

Clearly the system will operate when more than four satellites are measured by more than three devices in a cluster, In this case the equation set constructed becomes increasingly over determined and although this increases the required computations it leads to improved performance through statistical averaging and allows the use of error mitigation algorithms which can help to determine signal measurements with larger errors. These techniques are described elsewhere in the literature.

The system using both GNSS and local device relative measurements can equally be used in situations in which devices make measurements of satellites from more than one satellite system. The way in which the system is extended is exactly the same as that described for the first embodiment, with appropriate adaptations which will be clear to those skilled in the art.

The systems described are easily extended to a 2D solution, such that if the device positions are constrained to lie on a surface their positions on the surface can be described using only two positional variables rather than three, and this reduces the number of unknowns and therefore the number of measurements required. Simplification of the range equations and minimisation problem to 2D is well understood by those skilled in the art.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A method of locating positions of devices of a cluster of mobile devices, wherein a said device comprises a receiver to receive a location signal from a Global Navigation Satellite System (GNSS), wherein said location signal comprises timing data enabling a range to a satellite of said GNSS to be determined, and wherein a said device further comprises a transmitter to transmit said timing data to a remote receiver at a position processor, the method comprising:
receiving, at each device in a set of m said devices, signals transmitted by each satellite in a set of n satellites of said GNSS;
determining, at each device in said set of m said devices, timing data for said set of n satellites of said GNSS at each of said m devices to provide m·n measurements of said timing data;
communicating said m·n measurements of said timing data to said position processor, said communicating comprising:
transmitting, from each device of said set of m said devices, said determined timing data for said set of n satellites to said position processor;
using, at said position processor, said m·n measurements in combination with predetermined 3D positions for said n satellites at a time of each of said measurements to co-determine a corrected position in space for each of said m devices, a clock offset from a clock of said GNSS for each of said m devices, and a common space segment error for each of said n satellites, said common space segment error being a space segment error for a said satellite common to said m devices and including a satellite clock error for the satellite, and wherein a said corrected position in space comprises a said position in space corrected for said common space segment errors.

2. A method as claimed in claim 1 wherein m and n satisfy a constraint such that:

$$4 \cdot m + n \le m \cdot n.$$

3. A method as claimed in claim 1 wherein each of at least three of said devices includes a relative positioning system to enable determination of relative positions of said devices with reference to one another and to establish a common clock reference between the devices, the method further comprising establishing relative said positions for at least three of said m devices, and using said established relative positions in combination with said clock offset from said clock of said GNSS for each of said m devices, and said common space segment error for each of said n satellites to determine said corrected position in space for each of said m devices.

4. A method as claimed in claim 3 further comprising using said at least three devices to define a plane, and wherein said co-determining comprises determining a 3D position and 3D orientation of said plane and a time offset of said common clock reference from a clock of said GNSS.

5. A method as claimed in claim 3 wherein said relative positioning system is operable to establish a clock offset between a pair of said devices, and wherein said co-determining comprises minimising a cost function, wherein said cost function includes a set of ranges defining distances between said at least three devices and a set of time offsets defining relative clock offsets between said relative positioning systems of said at least three devices.

6. A method as claimed in claim 4 wherein each of said at least three devices receives a said location signal from at least three said satellites, and wherein one, more preferably two, most preferably three, of said at least three devices receives a said location signal from a fourth said satellite.

7. A method as claimed in claim 1 wherein said n satellites comprise satellites of two or more different GNSS constellations, and wherein said co-determining further comprises determining a time offset between said different GNSS constellations.

8. A method as claimed in claim 1 wherein a said device is able to determine from said location signal a velocity in a direction along a line from the device to a said satellite, the method further comprising using said devices to measure a plurality of said velocities, and wherein said co-determining includes constraining one or more of said corrected positions using said measured velocities.

9. A method as claimed claim 1 wherein said co-determining comprises minimising a cost function for said m·n measurements, the cost function being dependent on a difference between a range between a said device and a said GNSS satellite determined from said corrected position for said device and a combination of an apparent range derived from said timing data, a said clock offset for said device, and said common space segment error for the satellite providing said apparent range.

10. A method as claimed in claim 1 wherein said co-determining comprises solving a set simultaneous equations for said m·n measurements, said clock offset from a clock of said GNSS for each of said m devices and common space segment error for each of said n satellites.

11. A method as claimed claim 1 wherein said co-determining is performed in an earth central earth fixed coordinate system.

12. A carrier carrying processor control code to, when running, implement the method of claim 1.

13. A system for locating positions of devices of a cluster of mobile devices, wherein a said device comprises a receiver to receive a location signal from a Global Navigation Satellite System (GNSS), wherein said location signal comprises timing data enabling a range to a satellite of said GNSS to be determined, and wherein a said device further comprises a transmitter to transmit said timing data to a remote receiver at a position processor, the system comprising:
  means for receiving, at each device in a set of m said devices, signals transmitted by each satellite in a set of n satellites of said GNSS;
  means for determining, at each device in said set of m said devices, timing data for said set of n satellites of said GNSS at each of said m devices to provide m·n measurements of said timing data;
  means for communicating said m·n measurements of said timing data to said position processor, said means for communicating comprising:
    means for transmitting, from each device of said set of m said devices, said determined timing data for said set of n satellite to said position processor; and
  means for using, at said position processor, said m·n measurements in combination with predetermined 3D positions for said n satellites at a time of each of said measurements to co-determine a corrected position in space for each of said m devices, a clock offset from a clock of said GNSS for each of said m devices, and a common space segment error for each of said n satellites, said common space segment error being a space segment error for a said satellite common to said m devices and including a satellite clock error for the satellite, and wherein a said corrected position in space comprises a said position in space corrected for said common space segment errors.

14. A position processor for locating positions of devices of a cluster of mobile devices, wherein a said device comprises a receiver to receive a location signal from a Global Navigation Satellite System (GNSS), wherein said location signal comprises timing data enabling a range to a satellite of said GNSS to be determined, and wherein a said device further comprises a transmitter to transmit said timing data to a remote receiver at said position processor, the position processor comprising:
  an input to receive measurement data comprising timing data measurements from each device in a set of m said devices for each of a set of n satellites of said GNSS to form m·n timing data measurements at said position processor;
  a computation engine configured to use said m·n measurements in combination with predetermined 3D positions for said n satellites at a time of each of said measurements to co-determine a corrected position in space for each of said m devices, a clock offset from a clock of said GNSS for each of said m devices, and a common space segment error for each of said n satellites, said common space segment error being a space segment error for a said satellite common to said m devices and including a satellite clock error for the satellite, and wherein a said corrected position in space comprises a said position in space corrected for said common space segment errors.

15. A position processor as claimed in claim 14 wherein each of at least three of said devices includes a relative positioning system to enable determination of relative positions of said devices with reference to one another and to establish a common clock reference between the devices, and wherein said computation engine is configured to input data defining relative said positions for at least three of said m devices, and to use relative said positions for at least three of said m devices in combination with said clock offset from said clock of said GNSS for each of said m devices and said common space segment error for each of said n satellites to determine said corrected position in space for each of said m devices.

16. A carrier carrying processor control code to, when running control a processor to implement the computation engine of claim 14.

17. A method of determining one or both of location positions and velocities of a cluster of p mobile devices, wherein a set of m devices of said cluster of p mobile devices each comprise a receiver to receive a location signal from a Global Navigation Satellite System (GNSS) and a transmitter to transmit said timing data to a remote receiver at a position processor, and wherein m≤p, the method comprising:
  receiving, at each device in a set of m said devices, signals transmitted by each common satellite in a set of n common satellites of said GNSS;
  determining, at each device in said set of m said devices, code phase data and timing data for said n common satellites of said GNSS at each of said m devices to provide m·n measurements of code phase and timing data;
  communicating said m·n measurements of said code phase data and said timing data to said position processor, said communicating comprising:
    transmitting, from each device of said set of m said devices, said determined timing data for said set of n common satellites to said position processor;
  using, at said position processor, said m·n measurements of said code phase data and said timing data in combination with predetermined 3D positions for said n satellites at a time of each of said measurements to determine a pseudo-range of each of said m devices from each of said n common satellites, a clock offset from a clock of said GNSS for each of said m devices, a range velocity for each of said m devices, and a common space segment error for each of said n satellites,
  said pseudo-range being an estimated range of one of said n common satellites at one of said m devices, said estimated range comprising a real range portion and a common space segment error, said range velocity being the velocity along a line from a said device to a said satellite common to said m devices, said common space segment error being a space segment error for a said satellite common to said m devices and including a satellite clock error for the satellite;

using said pseudo-range, said range velocity, said clock offset and said common space segment error in combination with said predetermined 3D positions for said n satellites to co-determine one or both of a corrected position in space and a velocity for each of said m devices.

18. A method as claimed in claim 17 wherein m and n satisfy a constraint such that:

$$4 \cdot m + n \leq m \cdot n.$$

19. A method as claimed in claim 17 wherein at least one of said set of m devices of said cluster of p mobile devices and at least three devices of said cluster of p mobile devices include a relative positioning system to enable determination of relative positions of said devices with reference to one another and to establish a common clock reference between the devices, the method further comprising establishing said relative positions of said at least three devices of said cluster of p devices, and using said relative positions in combination with said pseudo-range, said range velocity, said clock offset and said common space segment error to determine a corrected position in space for each of said at least three devices.

20. A method as claimed in claim 19 wherein said relative positioning system is operable to establish a clock offset between a pair of said devices, and wherein said co-determining comprises minimising a cost function, wherein said cost function includes a set of ranges defining distances between said at least three devices and a set of time offsets defining relative clock offsets between said relative positioning systems of said at least three devices.

21. A method as claimed in claim 17 wherein said n satellites comprise satellites of two or more different GNSS constellations, and wherein said co-determining further comprises determining a time offset between said different GNSS constellations.

22. A method, system or position processor as recited claim 1 wherein a said corrected position in space is a corrected position in 3D space.

\* \* \* \* \*

UNITED STATES PATENT AND TRADEMARK OFFICE
CERTIFICATE OF CORRECTION

PATENT NO. : 9,651,665 B2
APPLICATION NO. : 13/825501
DATED : May 16, 2017
INVENTOR(S) : David Bartlett and Andy Thurman It is certified that error appears in the above-identified patent and that said Letters Patent is hereby corrected as shown below:

On the Title Page

Items (12) and (54), the first inventor's surname 'Barlett' should read -Bartlett-.

In the Specification

Column 10, Line 24, the parenthetical expression 'time× speed of light' should read -time × speed of light-.

Column 15, Line 48, the symbols for roll, pitch and yaw, should read -($\Phi$, $\theta$, $\varphi$)-.

Column 16, Line 1, the expression '$\{e^s\}$' should read -$\{\varepsilon^s\}$-.

Column 16, Line 2, the symbols for roll, pitch and yaw, should read -($\Phi$, $\theta$, $\varphi$)-.

Column 17, Line 6, the symbols for roll, pitch and yaw, should read -($\Phi$, $\theta$, $\varphi$)-.

Signed and Sealed this
Twenty-first Day of May, 2019

Andrei Iancu
*Director of the United States Patent and Trademark Office*